(12) United States Patent
Goodwill

(10) Patent No.: US 6,775,480 B1
(45) Date of Patent: Aug. 10, 2004

(54) FREE SPACE OPTICAL INTERCONNECT SYSTEM

(75) Inventor: Dominic John Goodwill, Kanata (CA)

(73) Assignee: Nortel Networks Limited (CA)

( * ) Notice: Subject to any disclaimer, the term of this patent is extended or adjusted under 35 U.S.C. 154(b) by 0 days.

(21) Appl. No.: 09/356,046

(22) Filed: Jul. 16, 1999

Related U.S. Application Data

(63) Continuation-in-part of application No. 09/150,242, filed on Sep. 10, 1998.
(51) Int. Cl.$^7$ .............................................. H04B 10/00
(52) U.S. Cl. ..................... 398/158; 398/119; 398/122; 398/151; 398/156; 398/159; 398/167
(58) Field of Search ................................ 359/159, 154, 359/161, 166, 172; 398/119, 122, 140, 151, 153, 156, 158, 159, 167

(56) References Cited

U.S. PATENT DOCUMENTS

| | | | | |
|---|---|---|---|---|
| 3,828,185 A | * | 8/1974 | Vandling | 250/199 |
| 5,532,858 A | | 7/1996 | Hirohashi et al. | 359/159 |
| 5,650,612 A | * | 7/1997 | Criswell et al. | 250/226 |
| 6,509,992 B1 | * | 1/2003 | Goodwill | 359/159 |

FOREIGN PATENT DOCUMENTS

| | | | | |
|---|---|---|---|---|
| DE | 19702634 A1 | * | 7/1998 | G05D/3/00 |
| DE | 197 02 634 A1 | | 7/1998 | H04B/10/10 |
| GB | 2221810 A | * | 2/1990 | H04B/9/00 |

OTHER PUBLICATIONS

"Optoelectronic ATM Switch Employing Hybrid Silicon CMOS/GaAs FET–SEEDs", Lentine, A.L., et al, SPIE Proceedings, vol. 2692,, Jan. 31–Feb. 1, 1996, San Jose, CA, pp. 100–108.

"Optical Bus Implementation System Using Selfoc Lenses", K. Hamanaka, Optics Letters, vol. 16, No. 16, Aug. 15, 1991, pp. 1222–4.

(List continued on next page.)

*Primary Examiner*—M. R. Sedighian
(74) *Attorney, Agent, or Firm*—Steubing McGuinness & Manaras LLP

(57) ABSTRACT

A free space optical interconnect system tolerant to misalignments and utilizing redundant elements of a transmitter and/or a receiver is provided. The elements are arranged into clusters, the number of clusters being redundant, and the number of elements in each cluster being sufficient to accommodate the number of data channels to be transmitted. The system also includes means for identifying misalignments between the transmitter and the corresponding receiver, including means for providing feedback between the transmitter and the receiver regarding the misalignment, and means for re-routing data from the cluster which is misaligned to the redundant cluster which thus redirects data to/from the correct physical location. Preferably, the elements are arranged into one-dimensional or two-dimensional arrays, the elements of the transmitter being optical emitters or optical modulators. Uni-direction and bi-directional link systems are implemented in various embodiments of the invention. A method for compensating misalignments in a free space optical interconnect system having redundant elements of the transmitter or the receiver is also provided.

63 Claims, 11 Drawing Sheets

OTHER PUBLICATIONS

"Optical Interconnection for Advanced Processor Systems: A Review of the ESPRIT II OLIVES Program", Journal of Lightwave Technology, vol. 9, No. 12, Dec. 1991, pp. 1764–73.

"Optical Beam Direction Compensating System for Board-to-Board Free Space optical Interconnection in High-Capacity ATM Switch", Hirabayashi, K., et al, Journal of Lightwave Technology, vol. 15, No. 5, May 1997, pp. 158–165.

"Alignment Tolerant Smart Pixels", Tooley, F.a.P., et al, IEEE Journal of Selected Topics in Quantum Electronics, Apr. 1996, vol. 2, No. 1, pp. 3–13; and in Digest, IEEE Summer Topical Meetings, Aug. 5–9, 1996, pp. 55–6.

Tooley, F., "Challenges In Optically Interconnecting Electronics", IEEE Journal of Selected Topics in Quantum Electronics, vol. 2, No. 1, Apr. 1996, pp. 3–13.

Patent Abstracts of Japan, vol. 1996, No. 12, Dec. 26, 1996, and JP 08 204640A (Sony Corp), Aug. 9, 1996 (abstract).

* cited by examiner

FREE SPACE OPTICAL INTERCONNECT SYSTEM

This application is a Continuation-in-Part of U.S. patent application Ser. No. 09/150,242 to Dominic Goodwill filed Sep. 10, 1998 and incorporated herein by reference. The present invention relates to a free space optical interconnect system, in particular to a system tolerant to misalignments.

FIELD OF THE INVENTION

Background of the Invention

Free space optical interconnect systems have long been proposed to deliver fast, highly parallel data transfer. These systems have the potential to obviate limitations of electrical interconnects, which are not capable of supporting data throughputs beyond a capacity of several hundred Gb/s, and to increase the capacity up to the Terabit/s range. Thus free space interconnect systems are promising and attractive alternatives for various telecommunication and computing applications.

However, the most important challenge preventing the current acceptance of free space interconnect systems is alignment. Two issues are of concern: the precision to which it is possible to align the system, and the precision to which it is necessary to maintain this alignment during operation. For practical applications it is necessary to establish and maintain alignment of circuit boards carrying transmitters and receivers, which may comprise an array of pixels, to within 10's of microns over a distance of meters. Such a system requires extremely expensive highly precision optomechanics, and to date has been implemented only in a controlled laboratory environment. In real product usage, when vibrations, temperature fluctuations and temperature gradients are encountered, the optical links move out of alignment and data is not correctly transferred.

Therefore, the goal of providing some alignment tolerance for optical links is to ensure the correct operation of all of the pixels on each array at the highest possible speed. Correct operation is defined as the correct reception of a logic 1 or logic 0 signal. Once the laser power, the receiver sensitivity and the detector area have been defined, the probability of correct reception of the logic bits is mainly a function of optical beam misalignment. Misalignment mechanisms can be due solely to mechanical movements, but in practice, optical effects can also contribute. Six degrees of freedom of the mechanical movements: translation in x, y, and z ($\Delta x$, $\Delta y$, $\Delta z$) and rotation about the x, y, and z axes ($\theta_x$, $\theta_y$, $\theta_z$), where x and y axes define the plane of an optical module in its nominal alignment position, with z axis being perpendicular to this plane, result in a number of optical effects. These include an image shift ($\Delta x$, $\Delta y$), image rotation ($\theta_z$), defocus ($\Delta z$) and image tilt ($\theta_x$, $\theta_y$) Image shift and rotation are basically lateral translation effects, and defocus and image tilt introduce defocus effects. Contributors to the overall lateral misalignment effects include:

- mechanical misalignment in x and y;
- mechanical rotation about the z axis;
- mismatches in focal lengths;
- wavelength shifts and laser mode-hops caused by temperature fluctuations and resulting in beam deflections introduced by diffractive elements;
- distortions of the image of an array of sources by the interconnect lens system, and
- telecentricity, when defocus, in addition to increasing spot size, introduces lateral misalignments in nontelecentric systems.

Contributors to the overall defocus effects include:
- source array tilt;
- image tilt;
- curvature of the plane of best focus;
- mechanical tilt about x and y axes;
- misalignment along z axis.

Numerous attempts have been made to increase alignment tolerance for optical interconnect systems which may be categorized as passive, active, or dynamic strategies.

However, passive alignment of dense, high speed free space optical interconnects for distances of more than 1 cm require mechanical support structures that are too expensive, difficult to align, and insufficiently stable for commercial applications, see, e.g., "Optoelectronic ATM switch employing hybrid silicon (MOS/GaAs) FET-SEEDS", A. L. Lentine et al., SPIE Proceeding, vol. 2692, pages 110–108, 1996; and "Optical bus implementation system using Selfoc lenses", K. Namanaka, Optics Letters, Vol. 16, No. 16, pp. 1222–1224, August, 1991. Passive alignment is done before any devices are powered up. This alignment technique is used in almost all electrical connectors, and most optical fiber connectors are passive. Recently, solder bump techniques have been applied to certain free space optical interconnect components, and preliminary reports indicate the potential for submicron alignment in all 6 degrees of freedom over a scale of up to 1 cm, J. W. Parker "Optical Interconnection for Advanced Processor Systems: A Review of the ESPRIT II OLIVES Program", L. Lightwave Technology 9 (12), 1764–1773, 1991.

Active alignment requires some feedback about the quality of the alignment. Usually the feedback is achieved by illuminating the system and monitoring the alignment either visually or by measuring a photocurrent in the detectors. Real-time active alignment is necessary if the alignment tolerances are tight or the system stability is poor so that the system will not remain aligned for a reasonable length of time. In this case, the feedback and alignment actuators must be integrated into the system to ensure permanent alignment. For example, CANON manufacturer uses image recognition and active beam-steering using a liquid filled variable angle prism in a single channel 155 Mb/s link product, which currently costs $100K. The product uses built in viewing cameras and optical pattern recognition techniques to define the system alignment, the complexity and cost of such a system clearly limiting widespread application. Alternatively, NTT has a system using actively controlled variable angle liquid filled prisms for board to board parallel free space optical interconnect, see. e.g. "Optical beam direction compensating system for board-to-board free space optical interconnection in high-capacity ATM switch", K. Hirabayashi et al., Journal of Lightwave Technology, Vol. 15, No. 5, May 1997. Cost, size, environmental ruggedness and reliability of these systems remain concerns.

Additionally, to develop both a marketable and reliable system, devices have to be packaged in a useful and reliable manner. For large systems including cumbersome and bulky mechanical parts providing alignment, this could involve an significant amount of physical space just to house all the individual components.

Recently, a proposal for avoiding high precision mechanics in free space interconnect systems by use of redundant detectors has been put forward by F. A. P. Tooley in IEEE Journal of Selected Topics in Quantum Electronics April 1996, vol. 2, No. 1, pp. 3–13 and in Digest, IEEE Summer Topical Meetings, Aug. 5–9, 1996, p. 55–56. This system increases tolerance to misalignment by providing an array of detectors in place of a single detector and electrically re-routing the misaligned optical data to the correct channel, or, alternatively, by replicating the signal a number of times. The overhead associated with increasing the alignment tolerance requires a control and router circuit, which adds electrical power consumption.

Therefore a need exists for development of alternative structures for free space optical interconnect systems which would avoid high precision mechanics, while providing precise alignment combined with simple design, reliability, low power consumption and compact packaging.

SUMMARY OF THE INVENTION

Thus, the present invention seeks to provide an optical interconnect system and method which avoid or reduce the above-mentioned problems.

Therefore, according to one aspect of the present invention there is provided a free space optical interconnect system comprising:

a transmitter and a receiver, at least one of the transmitter and the receiver comprising a plurality of elements arranged into clusters, the number of clusters being redundant and the number of elements in each cluster being sufficient to accommodate the number of data channels to be transmitted;

means for identifying a misalignment between the transmitter and the receiver; and means for re-routing data from the cluster which is misaligned to a redundant cluster providing data transmission through the system, the re-routing being performed in response to a signal generated by the means for identifying the misalignment.

Conveniently, the means for identifying the misalignment comprises means for providing feedback between the transmitter and the receiver regarding the misalignment.

In the first embodiment of the invention, the number of elements in each cluster is equal to the number of data channels to be transmitted. Alternatively the number of elements in a cluster may be more than the number of the transmitted data channels, with the means for re-routing data between the clusters further comprising means for re-routing data between the elements within a cluster. It is also possible to arrange that the number of elements in each cluster is less than the number of data channels to be transmitted, e.g. by using transmitter elements capable of transmitting more than one data channel (multi-wavelength lasers). The number of elements in different cluster may be equal or different, depending on the system requirements.

The elements of the transmitter and/or the receiver may be arranged into clusters, the clusters preferably being arranged into a one-dimensional or two-dimensional array, or any other pattern providing the required optical transmission or collection. The elements within clusters of the transmitter and/or receiver may also be arranged into a pre-determined pattern, and individual elements may or may not be shared by different clusters. The system may comprise one transmitter and one receiver only to provide a uni-directional interconnection. Alternatively, the system comprises two modules, each comprising one transmitter and one receiver, thus providing for a bi-directional data transmission and receiving of data.

Preferably, the system is implemented with optical elements, such as bulk optics (lenses, prisms, mirrors, splitters, et al.), binary optics (fanout gratings, diffractive lenses, et al.), holographic elements, and integrated optics.

Preferably, the elements of the transmitter are optical emitters or optical modulators. The emitters may be vertical cavity surface emitting lasers (VCSEL), light emitting diodes (LED) and edge emitting laser diodes or other known devices. The modulators may be modulators based on magneto-optic effect, modulators including liquid crystal devices, ferroelectric modulators, e.g. lead lanthanum zirconate titanate (PLZT) modulator, modulators including piezo-electric crystals, modulators including deformable mirrors, electro-optical semiconductor hetero-structure modulators, optical cavity modulators, or other known modulators.

The receiver of the optical interconnect system comprises at least one detector, preferably from PIN detector, metal-semiconductor-metal detector, avalanche photodiode, or other known detectors.

To identify misalignments of the system, the system includes identifying means, e.g. detectors for monitoring lateral and vertical misalignments, detectors for monitoring tilt misalignments, at least one dedicated alignment laser and at least one dedicated detector, and means for monitoring a signal level at the dedicated detector or detectors.

To provide feedback between the transmitter and the receiver regarding misalignments of the system, the system includes means providing a stable feedback mechanism which may be selected from optical fiber, LED, electrical cable, electrical backplane, or other convenient means.

When misalignments of the system occur, each cluster accommodates for misalignments within a predetermined spatial and angular deviation, the data being re-routed between clusters when the misalignment is beyond the deviation. Preferably, means for re-routing of data provide cycling through the clusters of at least one of the transmitter and the receiver according to a predetermined orthogonal pattern which ensures alignment of the system. Alternatively, re-routing of data may be done by cycling through the clusters at different rates or any other method to provide alignment of the system. In the case of a system redundancy both of lasers and of and of detectors, preferably the lasers compensate for a gross misalignment, and the detectors simultaneously make additional fine compensation of misalignment. Preferably, the transmitter and/or receiver, or, alternatively, the whole system described are integrated within a package or several packages, thus providing compactness and efficient use of space.

According to another aspect of the invention there is provided a method of compensating misalignments in a free space optical interconnect system comprising a transmitter and a receiver, at least one of the transmitter and the receiver comprising a plurality of elements whose number is redundant, the elements of at least one of the transmitter and the receiver being arranged into clusters, the number of clusters being redundant and the number of elements in each cluster being sufficient to accommodate the number of data channels to be transmitted, the method comprising the steps of:

identifying a misalignment between the transmitter and the receiver; and re-routing data from the cluster which is misaligned to a redundant cluster providing data transmission through the system, the re-routing being performed in response to a signal generated at the step of identifying the misalignment.

Conveniently, the step of identifying the misalignment further comprises sending a feedback signal between the transmitter and the receiver regarding the misalignment. Additionally, the method may further include a step of arranging that the number of elements in each cluster is equal to the number of data channels to be transmitted. Alternatively, it may be arranged that the number of elements in each cluster is not equal to the number of the transmitted channels, e.g. being more than the number of channels. In this situation, the step of re-routing data between the clusters may further comprise re-routing of data between the elements within a cluster.

Beneficially, the method provides a continuous misalignment compensation of the system within a predetermined angular and space deviation, the identifying of misalignments being made by monitoring a signal level at the receiver. Preferably, re-routing of data is performed by cycling through the clusters according to a predetermined orthogonal pattern or by cycling through the clusters at different rates ensuring alignment of the system, and the elements of the transmitter and/or receiver may or may not be shared by different clusters.

According to yet another aspect of the invention there is provided a method of compensating misalignments in a bi-directional free space optical interconnect system comprising a first module and a second module, each module having a transmitter and a receiver, at least one of the transmitter and the receiver at each module comprising a plurality of elements arranged into clusters, the number of clusters being redundant and the number of elements in each cluster being sufficient to accommodate the number of data channels to be transmitted, the method comprising the steps of:

(a) defining an orthogonal sequence of pairs of clusters, each pair comprising one cluster from each module;
(b) choosing a first pair from the sequence;
(c) re-routing data to the selected pair of clusters;
(d) monitoring corresponding signal levels of the data at the receivers;
(e) comparing signal levels at the receivers with predetermined threshold values;
(f) when the signal level at least at one of the receivers is below the threshold value, re-routing the data to the next pair of clusters from the sequence and repeating the steps (d), (e) and (f).

According to yet another aspect of the invention there is provided a module for a free space optical interconnect system, comprising:

at least one of a transmitter and a receiver, at least one of the transmitter and the receiver comprising a plurality of elements arranged into clusters, the number of clusters being redundant and the number of elements in each cluster being sufficient to accommodate the number of data channels to be transmitted;

means for re-routing data from the cluster which is misaligned to a redundant cluster in response to feedback identifying a misalignment of the module.

Conveniently, the number of elements in each cluster is equal to the number of data channels to be transmitted. Alternatively, the number of elements in each cluster may be more than the number of data channels to be transmitted, with the means for re-routing data between the clusters further comprising means for re-routing data between the elements within a cluster. It is also possible to arrange that the number of the elements within the cluster is less that the number of the data channels to be transmitted, e.g. by using multi-wavelength lasers. The number of elements in different clusters may be equal or different depending on the module requirements.

Conveniently, the module further comprises means for identifying a misalignment of the module in the system, which may include detectors for monitoring lateral and vertical misalignments, detectors for monitoring tilt misalignments, a dedicated alignment laser and a dedicated detector, or means for monitoring a signal level at the receiver.

Preferably, the clusters of the module are arranged in a one-dimensional or two-dimensional array, or any other pattern providing a required light transmission or collection. The module may include one transmitter only or one receiver only for corresponding uni-directional transmittance or reception of data. Alternatively, the module may include both a transmitter and a receiver for corresponding transmitting and receiving of data in a bi-directional optical interconnect system. The elements of the transmitter and/or receiver may or may not be shared by different clusters, the elements of the transmitter being preferably optical emitters or optical modulators. Preferably, the module described above is integrated within a package.

Free space interconnect systems formed using the techniques described above are much more tolerant to misalignments between circuit packs compared to electrical connectors or other existing free space optical interconnect systems. The use of redundant elements of the transmitter, or redundant clusters of elements in the transmitter or receiver modules obviates the need of packaging which requires precise alignment and which is often expensive and bulky. The interconnect systems based on the present invention have simpler mechanical design, have no moving parts and may be implemented with lower cost mechanics. As a result, they can be manufactured more readily and at much lower cost, and providing higher reliability at the same time.

BRIEF DESCRIPTION OF THE DRAWINGS

The invention will now be described in greater detail with references to the attached drawings wherein.

DETAILED DESCRIPTION OF THE PREFERRED EMBODIMENTS

Figure 1:
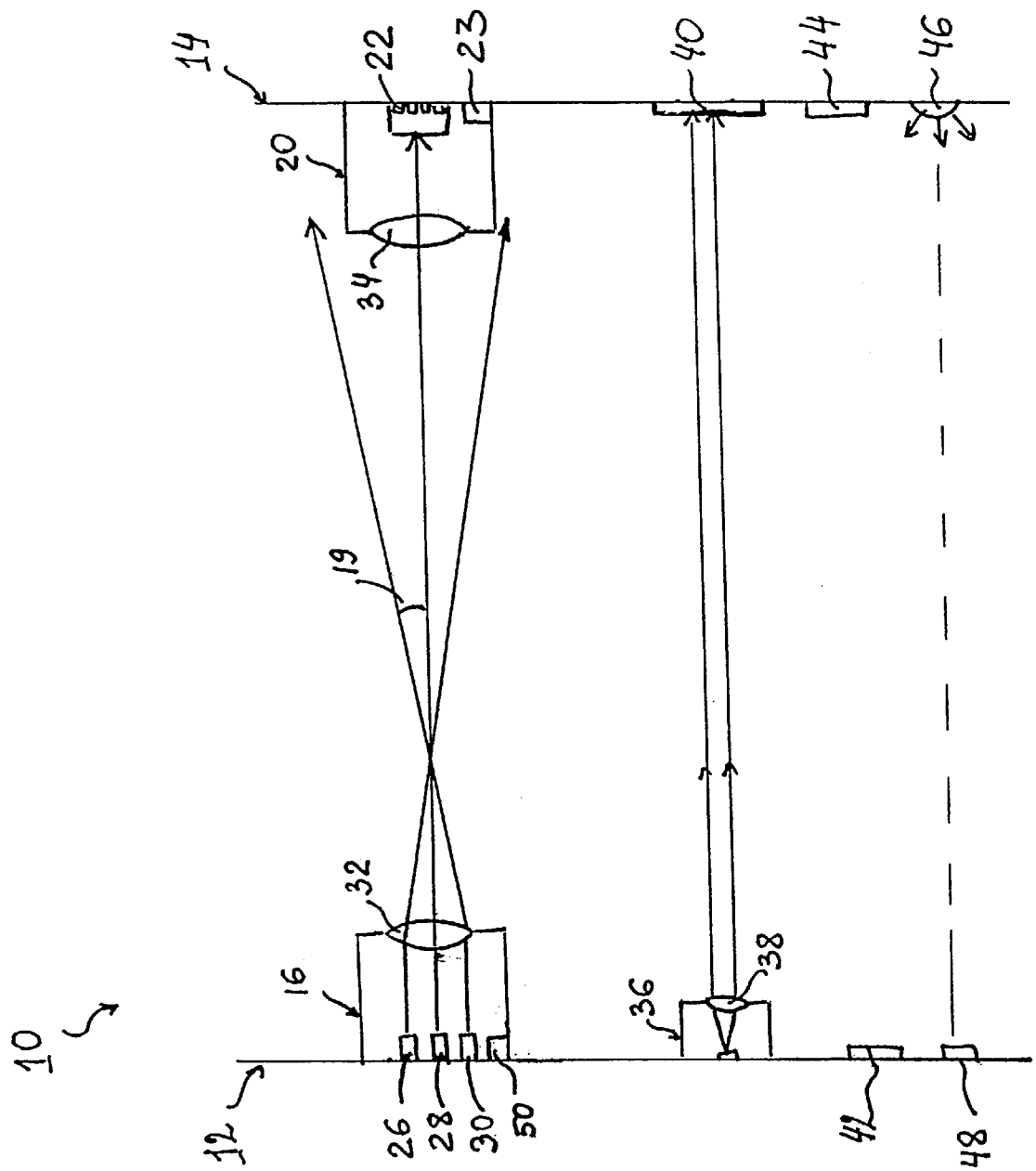
FIG. 1 illustrates a schematic view of the free space optical interconnect system for a uni-directional link according to a first embodiment of the invention.

A schematic view of a free space optical interconnect system 10 according to a first embodiment of the present invention is shown in FIG. 1. The system 10 comprises a first module 12, the module being a transmitter module, and a second module 14, the module being a receiver module, and provides a uni-directional link between the modules. The transmitter module 12 carries a transmitter 16 having a plurality of transmitter elements 18 (shown in FIG. 2) for transmission of data, the receiver module carrying the corresponding receiver 20 having a plurality of receiver elements 22 for receiving the data. Each of the transmitter elements 18 is a vertical cavity surface emitting laser (VCSEL), emitting a beam normal to the plane of the module 12 through the lens 32 of the transmitter package 16, and the receiver elements 22 are detectors, preferably forming a one-dimensional array. The lasers 18 are arranged into clusters 26, 28 and 30, and as a way of example, the number of lasers in each cluster being equal to the number of data channels to be transmitted. The number of clusters is redundant, i.e. the system includes more lasers than are necessary to transmit the data, the lasers being assigned to clusters either permanently when they are not shared by different clusters or dynamically when lasers are shared by different clusters if needed (see below).

Figure 2:
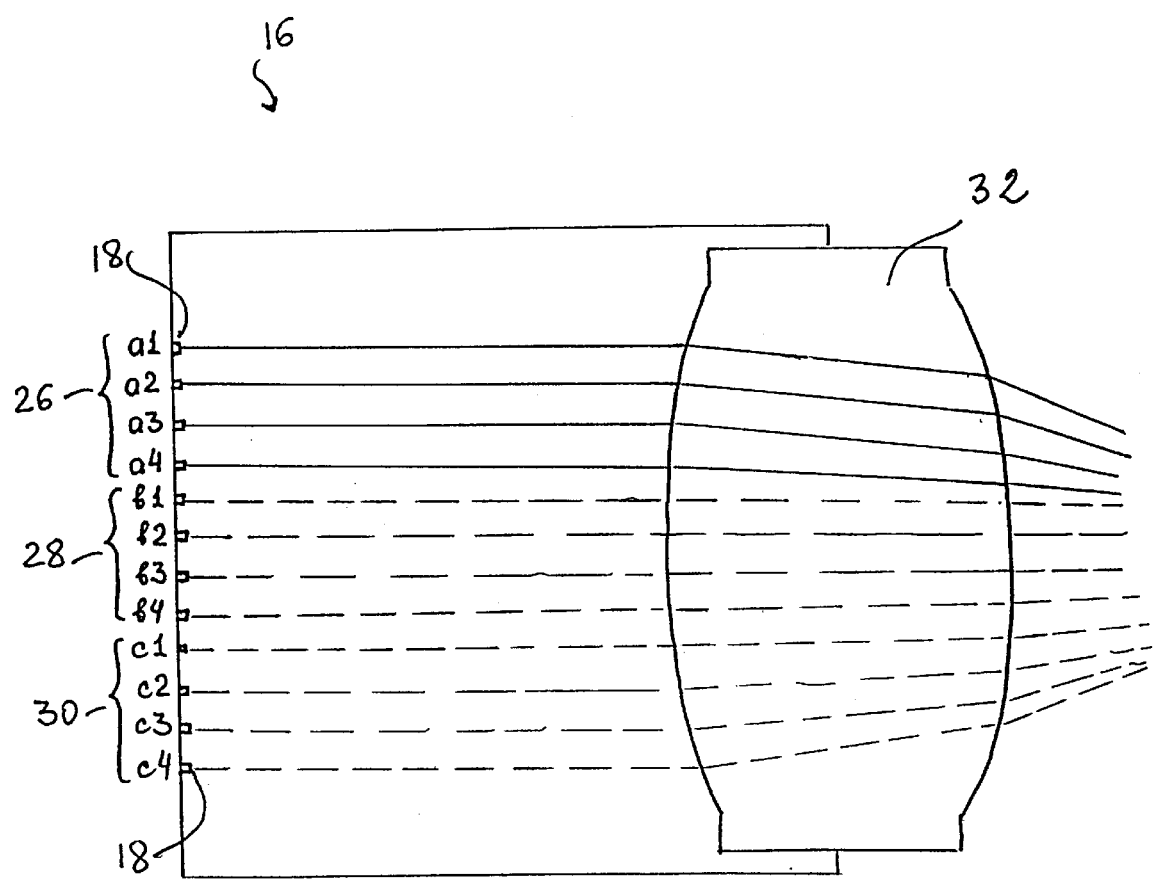
FIG. 2 illustrates an arrangement of the transmitter elements into one-dimensional array of clusters according to the embodiment of FIG. 1.

An arrangement of the transmitter elements 18 is shown in more detail in FIG. 2. The transmitter 16 is designed to support/transfer 4 data channels. It includes twelve lasers 18 which form three clusters 26, 28, and 30 having elements (a1, a2, a3, a4), (b1, b2, b3, b4) and (c1, c2, c3, c4) correspondingly as shown in FIG. 2, the distance between the adjacent lasers being 0.25 mm to 1.25 mm. Thus, the number of elements in each cluster is equal to the number of data channels to be transmitted, and the system supports four data channels with 3-fold redundancy. The clusters 26, 28 and 30 and the lasers 18 within the clusters form a one-dimensional array as shown in FIG. 2. The lasers 18 are housed together with driver circuits 50 in a package on the transmitter module 12. Laser beams from lasers 18 are emitted through the lens 32 collimating or nearly collimating the light and received at the detector array 22 being focused on the array through the lens 34. The detectors 22 are housed together with receiver circuits 23 in a package on the receiver module 14.

Means for identifying a misalignment between the transmitter 16 and the receiver 20 is implemented by use of a dedicated alignment laser 36 packaged with a lens 38 (FIG. 1) so as to emit a narrow beam perpendicular to the transmitter module 12. The beam is received by a large slow position sensing alignment detector 40 carried by the receiver module 14 which monitors the mutual alignment of modules 12 and 14, and as a result, the alignment of the transmitter 16 and the receiver 20. Means for providing feedback regarding the misalignment between the modules is implemented by use of control circuitry 42 and 44 at the transmitter and receiver modules correspondingly, light emitting diode (LED) 46 at the receiver module 14, and a feedback detector 48 at the transmitter module 12. The transmitter 16 also includes means for re-routing data between clusters implemented by use of drive circuitry 50, shown in detail in FIG. 3 and described below.

Figure 3:
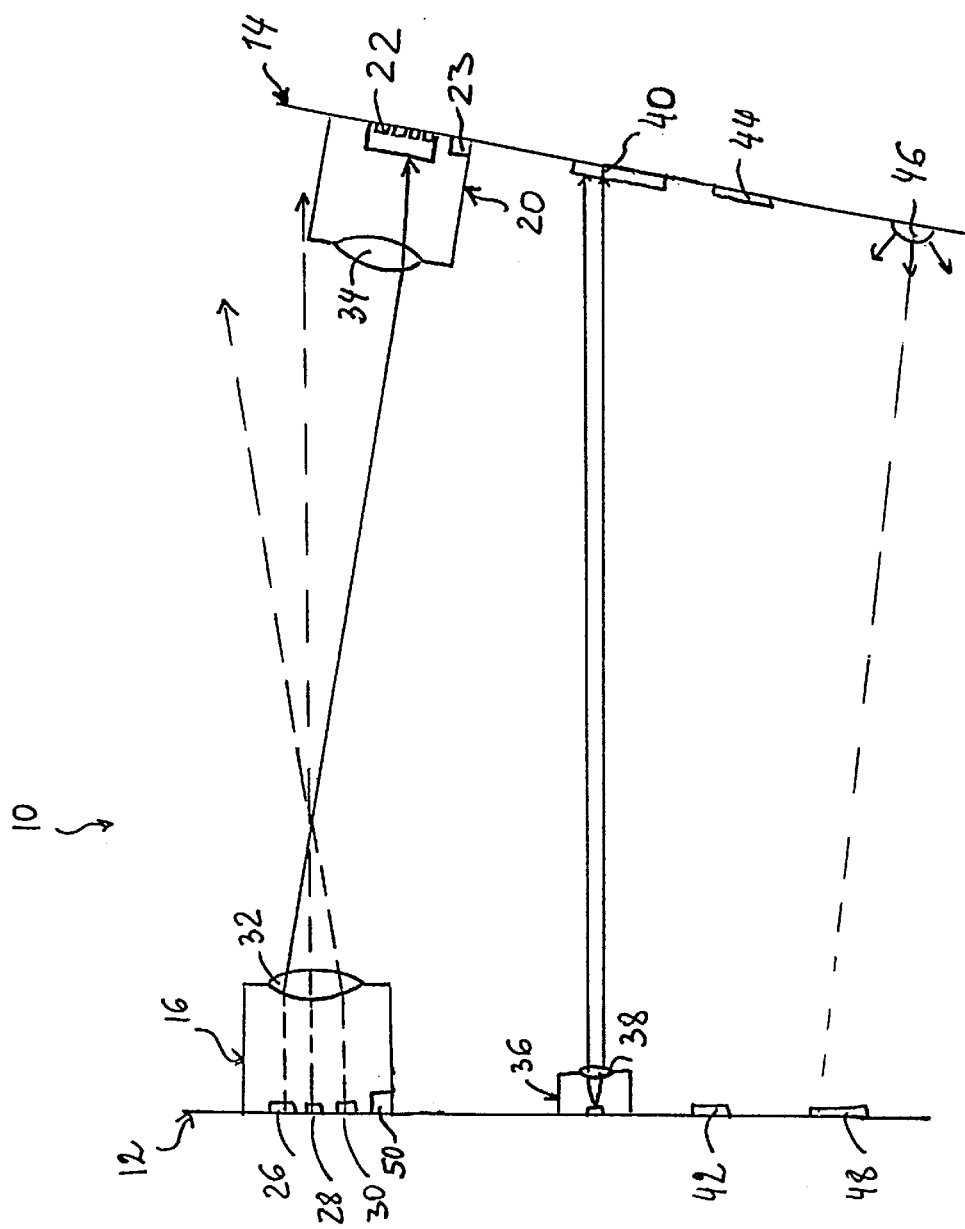
FIG. 3 illustrates misalignment compensation in the embodiment of FIG. 1.

The system 10 operates in the following manner. First, the data to be transmitted are routed to one of the clusters 26, 28, 30, for example, the cluster 28 as shown in FIG. 1, the lasers 18 of the cluster emitting light which is collimated by lens 32 and sent to the receiver 20. The focusing lens 34 collects the light from the lasers 18, and produces one spot from each activated laser on the detectors 22. Simultaneously, the alignment laser 36 sends a reference beam through the lens 38, and the beam is received by a position sensing alignment detector 40. The position of the reference beam on the detector 40, and consequently the position of the module 14, is read out by a control circuit 44, and the position information is fed back by the LED 46 to a feedback detector 48 and the laser control circuit 42 on the first module 12. If the modules 12 and 14 are misaligned as shown in FIG. 3, the laser beams generated by the cluster 28 do not hit the detectors 22, and the data is lost. The drive circuit 50 re-routes the data to be transmitted to another cluster, e.g. the cluster 26 in FIG. 3, which sends the data to the correct physical location at the detectors 22, thus compensating for the measured misalignment.

Figure 4:
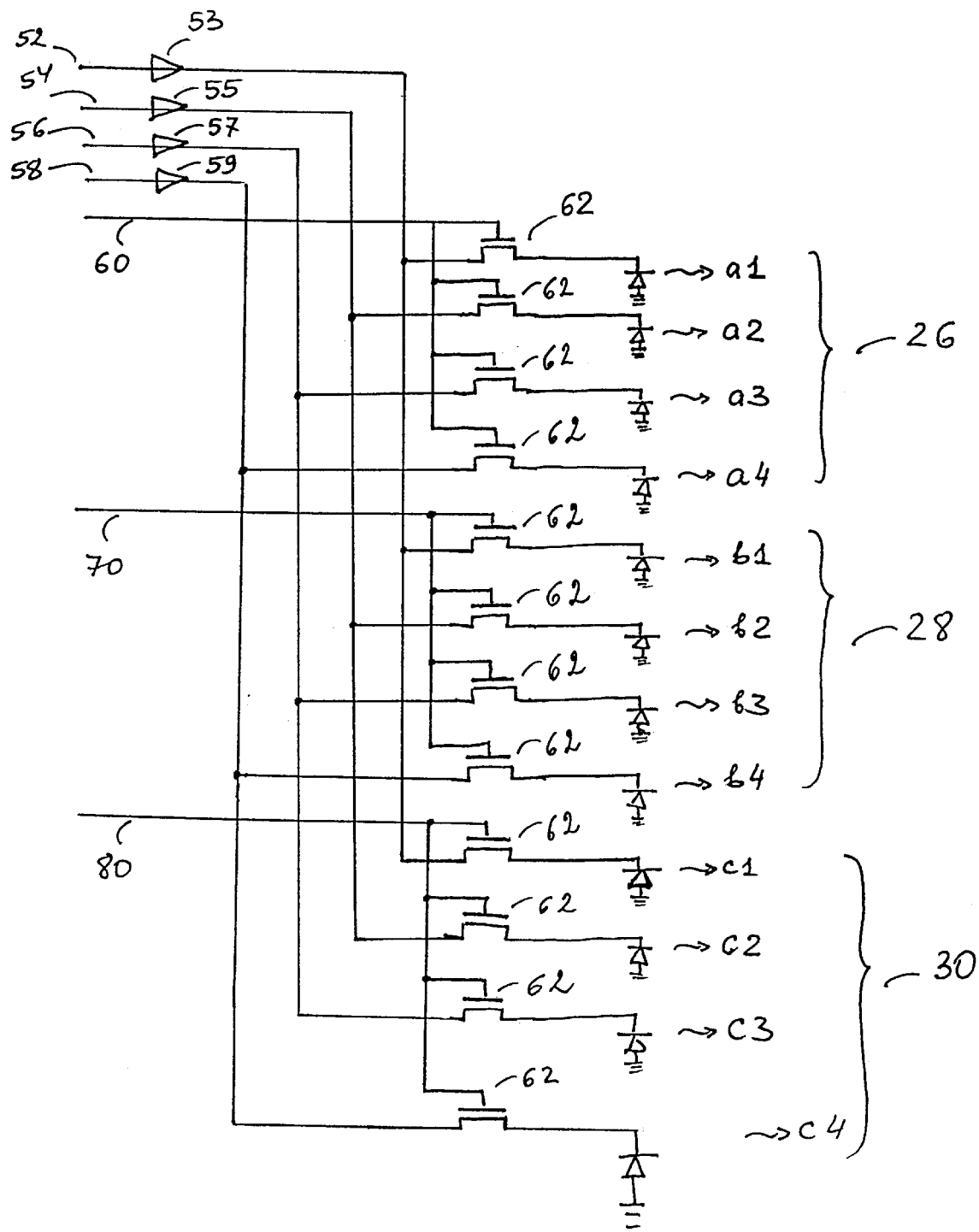
FIG. 4 illustrates a drive circuitry for the transmitter according to the embodiment of FIG. 1.

The drive circuit 50 shown in detail in FIG. 4 operates in the following manner. Data to be transmitted is presented to the drive circuitry on 4 data channel inputs 52, 54, 56, 58 as digital logic signals, which are converted by laser drive amplifiers 53, 55, 57, 59 respectively into the signal levels required to drive the lasers in the clusters 26, 28 30. The control circuit 44 generates digital signals on control inputs 60, 70, 80, which cause pass, transistors 62 to be open or closed, so as to connect the data channel input 52 to laser a1, b1, or c1, input 54—to laser a2, b2, or c2, input 56—to laser a3, b3, or c3, and input 58—to laser a4, b4 or c4.

The system 10 is packaged in the following manner. The transmitter module 12 and receiver module 14 comprise part of printed circuit boards. The printed circuit boards are mounted in shelves, racks and frames made of plastic and metal. The printed circuit boards, shelves, racks and frames have holes and windows as necessary to allow the data, alignment and feedback light to pass. The laser clusters 26, 28, 30, the drive circuit 50 and the lens 32 are mounted using adhesives within a metal and ceramic multi-chip package, and the package is soldered onto the substrate of the transmitter module 12. Likewise, the detectors 22, the receiver circuit 23 and the lens 34 are similarly packaged and mounted.

Power consumption in the transmitter 16 is minimized by the sharing of laser drive amplifiers 53, 55, 57, 59 by three lasers each. The power consumed by each laser drive amplifier 53, 55, 57, 59 is about 0.25 W, and the whole 4-channel transmitter 16 consumes a power of about 1 W. The heat generated is dissipated by the metal and ceramic package of the transmitter 16. The system is capable of providing efficient heat dissipation for number of channels up to fifty and/or redundancy of nine-fold or more.

The optical interconnect system 10 described above has the following dimensions: separation between modules 12 and 14 is about ~10 inches, focal lengths of the lenses 32 and 34 are about 10 mm, an angle between the laser beams generated by adjacent clusters, designated by numeral 19 in FIG. 1, is about 1 degree. These dimensions provided about 4 mm alignment tolerance over 10 inches of interconnect distance. Other dimensions of the system may be also used to provide alignment of the system for larger distances, e.g. up to meters.

Instead of the system above providing one-directional link, an alternative embodiment of the system provides a bi-directional link, having one transmitter and one receiver at each module for corresponding transmittance and reception of data.

In the embodiment described above, the number of the elements in each cluster is equal to the number of the data channels to be transmitted. It is also contemplated that other embodiments of the invention may comprise clusters of elements whose number is not equal to the number of the transmitted data channels. For example, the number of elements in a cluster may exceed the number of channels. Then it would be convenient to arrange for the re-routing means to includes additional means providing re-routing of data between the elements within each cluster. It is also possible to have the number of elements in each cluster less than the number of data channels, e.g. by using multi-wavelength lasers, each capable of transmitting multiple data channels. The number of elements in different cluster may be equal or different, depending on the system requirements.

In another embodiment it is contemplated that the elements of the receiver 20 only may be arranged into clusters in a way similar to that described above. Alternatively, the elements of both of the transmitter 16 and the receiver 20 may be arranged into redundant clusters. Correspondingly, re-routing of data would be performed then between redundant clusters of the receiver 20 or the transmitter 16, or both of them depending on the amplitude and type of misalignments of the system. In this embodiment, the transmitter 16 compensates for gross misalignments, and the receiver 20 makes additional fine compensation of misalignment.

Numerous modifications can be made to the embodiments described above. The elements 18 of the transmitter 16 chosen to be VCSEL in the first embodiment may be substituted by other types of emitters or optical modulators. The emitters may be VCSEL, LED, edge emitting laser diodes, or other known devices. The modulators may be selected from modulators based on magneto-optic effect, modulators including liquid crystal devices, ferroelectric modulators, e.g. PLZT modulators, modulators including piezo-electric crystals, modulators including deformable mirrors, electro-optical semiconductor hetero-structure modulators, optical cavity modulators, or other known modulators. Similarly, other modifications of the embodiment may include use of integrated optics components (holographic elements, fanout gratings, diffractive lenses) and/or other bulk optical elements, e.g. arrays of microlenses, prisms and splitters instead of lenses used for collimating and focusing laser beams, or other known optical components. The receiver elements may be a detector array or a single detector, the light may fall directly onto detectors, or a microlens concentrator array can be included which enhances the misalignment tolerance and increase the efficiency of light collection. Modifications to the means for identifying misalignments between the modules may include detectors for monitoring lateral and vertical misalignments, detectors for monitoring tilt misalignments, or means for monitoring a signal level at the receiver, e.g. a detector measuring a photocurrent at the receiver, or other suitable devices. The transmitter elements may have a separate lens from the lens of the alignment laser, or the transmitter elements and the alignment laser may share a lens. The detectors may be chosen from PIN detectors, metal-semiconductor-metal detector, avalanche photodiode, or other suitable detectors.

Further modifications to the system may include different means for providing feedback between the transmitter and the receiver regarding the misalignments, which may be connected by optical fiber, electrical cable, electrical backplane, or other convenient means.

Re-routing of data between clusters may be done in different ways, e.g. the data may be re-routed between clusters by cycling through the clusters of at least one of the transmitter and the receiver according to a predetermined orthogonal pattern, i.e. according to a particular sequence of clusters which ensures an alignment of the system. Alternatively, for a system providing a bi-directional link, cycling through the clusters may be performed according to the orthogonal sequence of pairs of clusters, or by cycling through the different sets of clusters at different rates, e.g. clusters of the transmitter are cycled at a different rate than clusters of the transmitter, ensuring overall that the system is aligned. In addition, cycling through the clusters may proceed in an order which is calculated to take the least time on average, e.g. by starting with clusters which are closest to the most recently used clusters so as to compensate rapidly for small misalignments, or by starting with clusters close to the center of the laser and/or detector arrays. Cycling through the clusters may be done by first selecting simultaneously all the clusters in one half of the transmitter and/or receiver array, then selecting successively 50% fewer clusters in one or more interactive steps based on the success or failure of the clusters selected in the previous step, until the good cluster is uniquely determined.

To reduce component count and physical size, the elements of the transmitter and/or receiver may be shared by two or more clusters. For example, in the embodiment described above the number of lasers may be less than 12 in total and same lasers may be assigned to different clusters. In this case each laser will carry a different data channel depending on which cluster is activated. Similarly, the receiver elements can be shared by one or more clusters if the receiver elements are arranged into clusters. The number and/or arrangement of clusters to which a layer or a receiver element is assigned may be changed in real time to meet a varying demand of traffic patterns through the system. In the embodiment described above, the interconnection is formed between two modules, each of the modules may be a board, a chip, an equipment rack, an equipment shelf or an equipment frame. The transmitters and receivers may be housed in different packages, they may be built as separate chips within the same package, or they may be placed on the same chip.

Figure 5:
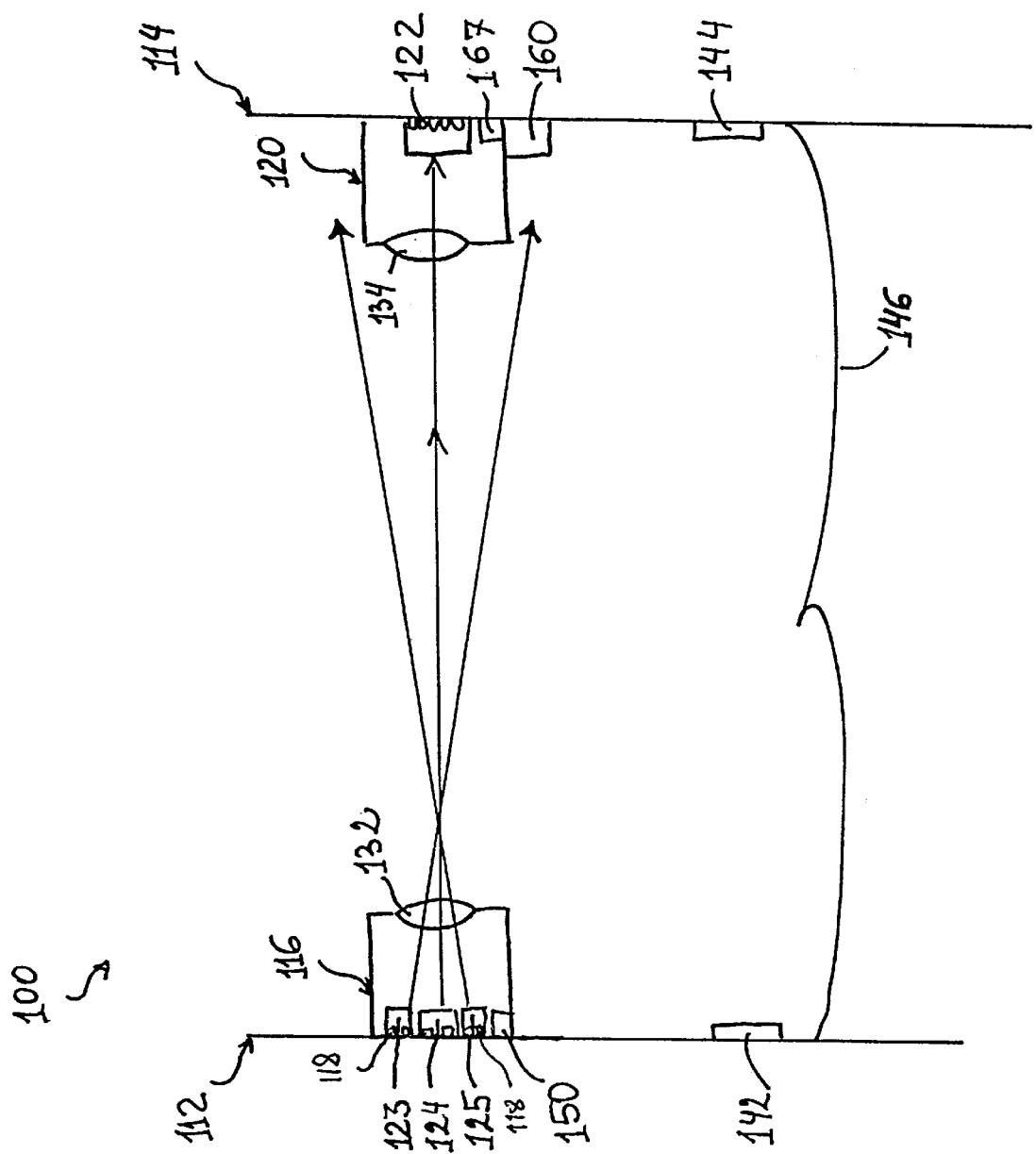
FIG. 5 illustrates a schematic view of a free space optical interconnect system according to a second embodiment of the invention.

A free space optical interconnect system 100 according to a second embodiment of the invention is shown schematically in FIG. 5. The system provides a uni-directional link and comprises a transmitter module 112 and a receiver module 114 carrying a transmitter 116 and a receiver 120 correspondingly, the transmitter 116 having a plurality of lasers (transmitter elements) 118 arranged into a two-dimensional array of clusters 123–131 shown in detail in FIG. 6, and the receiver 120 having a plurality of detectors 122. The system 100 also includes control units 142 and 144 at the transmitter and receiver modules 112 and 114 correspondingly, means for identifying misalignments implemented by use of circuitry 160 measuring photocurrent from the detectors (receiver elements) 122, and means for providing feedback between the transmitter and the receiver regarding the misalignment of the system implemented by use of control units 142 and 144 through an electrical cable connection 146. The system also includes drive circuitry 150 (not shown in detail) similar to that of FIG. 3, but providing a two-dimensional re-routing between clusters, and receiver circuitry 167.

Figure 6:
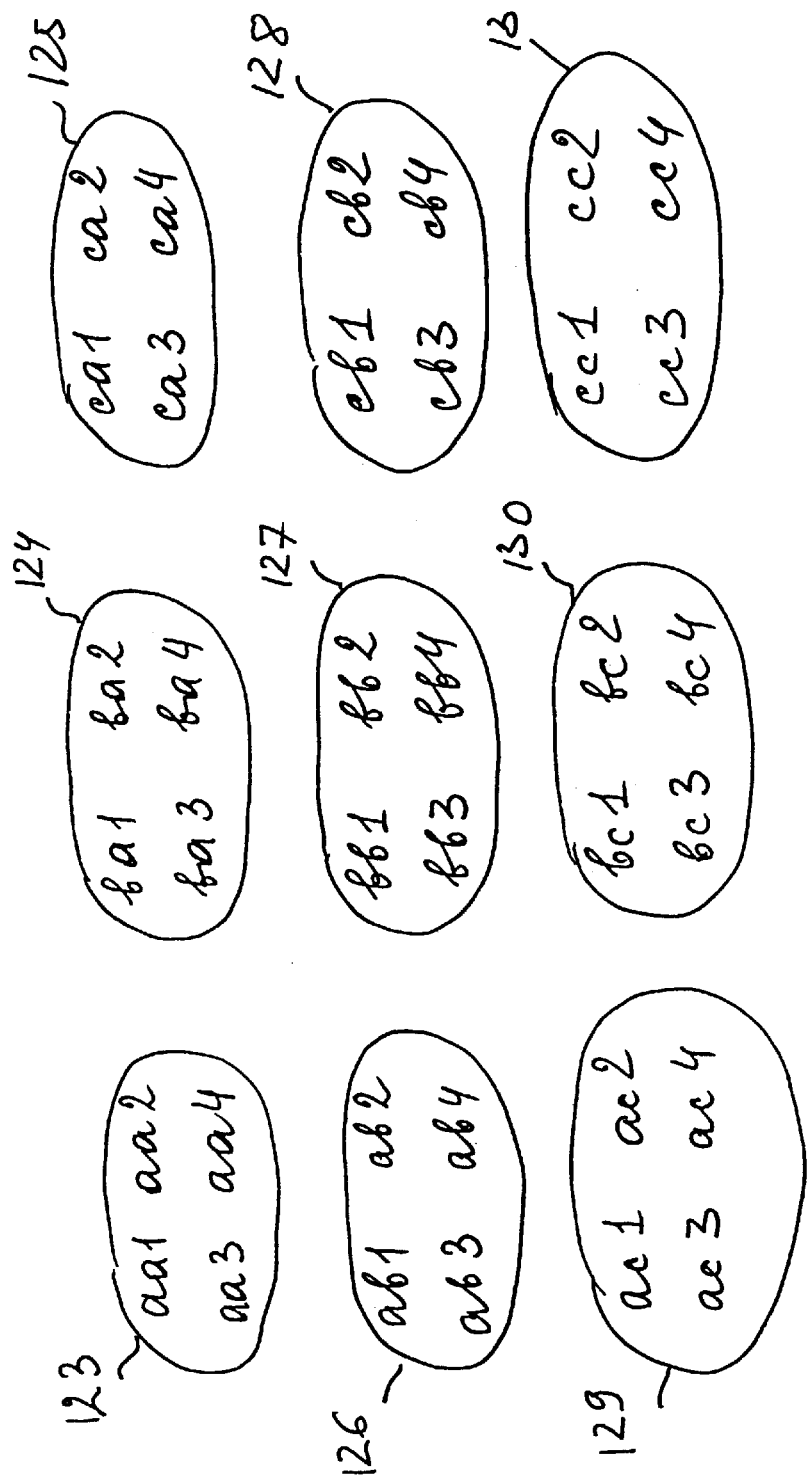
FIG. 6 illustrates an arrangement of the transmitter elements into two-dimensional array of clusters according to the embodiment of FIG. 5.

By way of example, the system shown in FIGS. 5 and 6 supports 4 data channels with 3-fold redundancy in two dimensions (horizontal x and vertical y) which requires 36 lasers in total arranged into nine clusters designated by numerals 123 to 131. Each cluster has 4 lasers arranged in a square, e.g. clusters 123 and 131 have elements (aa1, aa2, aa3, aa4) and (cc1, cc2, cc3, cc4) respectively. The distance between the adjacent lasers is about 0.25 mm, and the nine clusters form a 3×3 array, with the center of the clusters being on a 1.25 mm pitch. The laser clusters 123–131 are offset from each other across the surface of the transmitter module 112. Thus, after passing through the collimation lens 132, each laser cluster produces beams directed at different angles in a three dimensional space.

The system 100 operates in the following manner. Data to be transmitted, being initially routed to one of the clusters 123–131 of the transmitter 116, are sent through the lens 132 collimating the light and received at the detectors 122 of the receiver 120 being focused by lens 134. The circuitry 160 measures a photocurrent at the detectors 122 and compares it with predetermined threshold values for each detector. The results of the measurements are processed by a control circuit 144, and a feedback signal regarding a misalignment is sent back to the control circuit 142 of the transmitter module 112 via electrical cable 146. In response to the feedback signal, the control circuit 142 selects which cluster to use to correct for physical misalignment, and the drive circuitry 150 re-routes the data to another cluster which emits beams in the approximately correct direction and location.

It is also contemplated that other embodiments of the invention may comprise other two-dimensional arrangements of the clusters to form patterns such as a square grid, a circle, ellipse, octagon, cross, or star, or more complex patterns to achieve the required light transmission or collection. Additionally, each cluster itself may comprise elements arranged into a pre-determined pattern, the elements of the transmitter and/or receiver being arranged into clusters. In general, the spatial pattern defined by the receiver clusters does not need to match that formed by the transmitter clusters. Additionally, the clusters may be spatially discrete as in the embodiment of FIG. 5, or the clusters may be interleaved. The transmitter or receiver elements may be shared by different clusters and other modifications similar to ones of the first embodiment listed above are also applicable to the second embodiment of the invention.

Figure 7:
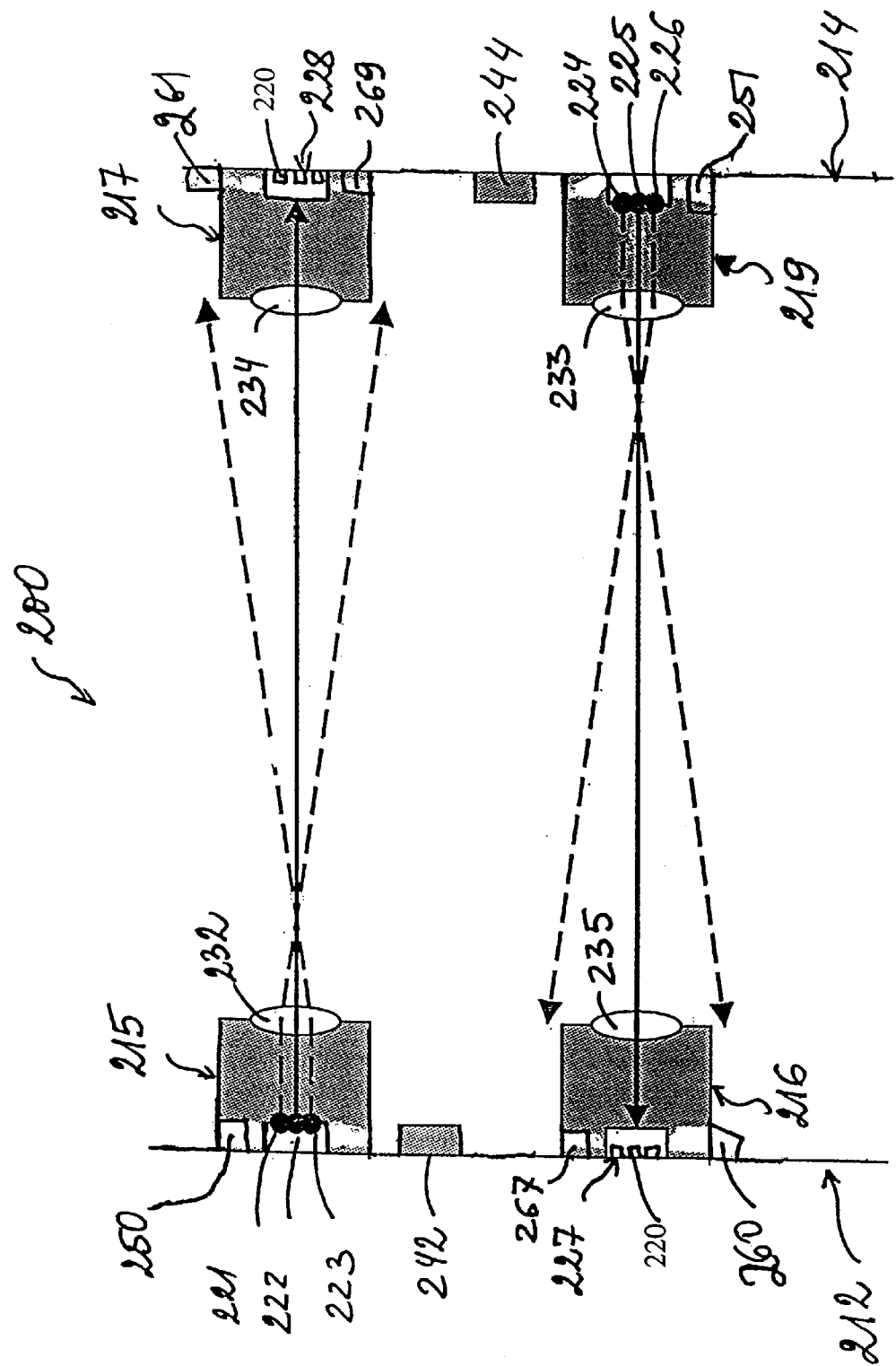
FIG. 7 illustrates a schematic view of a free space optical interconnect system for bi-directional link according to a third embodiment of the invention.

A free space optical interconnect system 200 according to a third embodiment of the invention is schematically shown in FIG. 7. The system comprises a first module 212 and a second module 214, the first module carrying a first transmitter 215 and a first receiver 216, the second module carrying a second receiver 217 and a second transmitter 219. Each of the transmitters 215 and 219 has a plurality of transmitter elements 218 (not shown) for transmittance of data, each of the receivers 216 and 217 having a plurality of receiver elements 220 for receiving the data. The transmitter elements 218 are vertical cavity surface emitting lasers (VCSEL), emitting beams normal to the planes of the modules 212 and 214. The elements 222 of the receivers 216 and 217 are detectors forming one-dimensional arrays 227 and 228 respectively, the detector arrays 216 and 217 being connected to the receiver circuit arrays 267 and 269 respectively. The lasers 218 of the first transmitter 215 are arranged into clusters 221, 222, 223, the lasers of the second transmitter 219 being arranged into clusters 224, 225, 226. Similar to the embodiments described above, the number of clusters at each of the transmitters is redundant, and the number of lasers in each cluster is equal to the number of data channels to be transmitted. An arrangement of the transmitter elements 218 into clusters at the modules 215 and 219 is similar to that one shown in FIG. 2. Laser beams from the clusters at the modules 215 and 219 are emitted through respective lenses 232 and 233 which collimate or nearly collimate the light, and are detected at detector arrays 228 and 227 correspondingly, being focused on the arrays through lenses 234 and 235. The system further includes the following components at each of the first and second modules correspondingly: control circuitry 242 and 244, thresholding circuitry 260 and 261 for measuring signal levels at the receivers 216 and 217, drive circuitry 250 and 251 for re-routing data between clusters of the transmitters 215 and 219 similar to that shown in FIG. 4.

Figure 8:
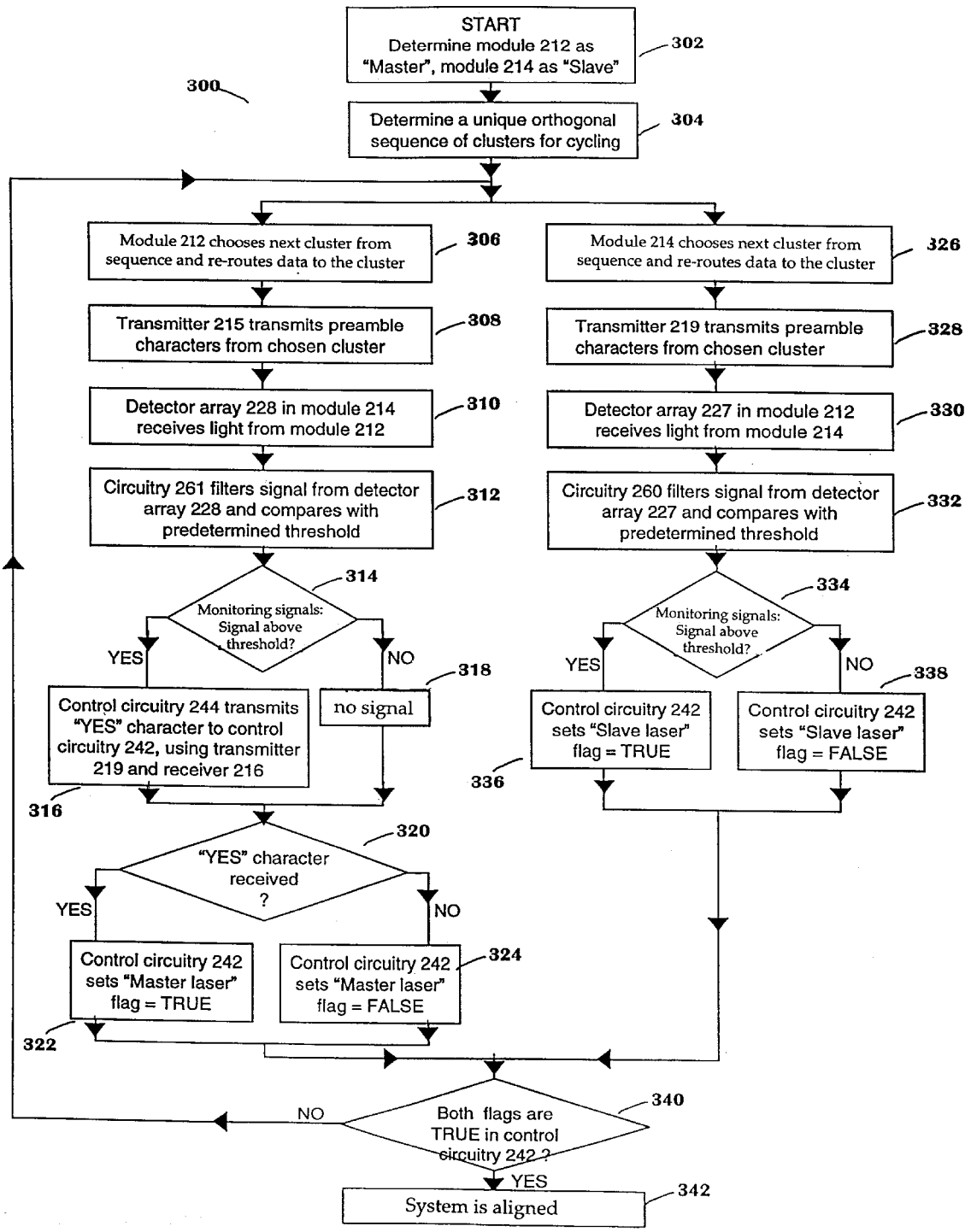
FIG. 8 shows a flowchart for a method for misalignment compensation based on hunting algorithm.

Advantageously, in this embodiment a separate feedback connection, (e.g. electrical cable, electrical backplane, optical fiber or LED) is not required. The transmitters 215, 219 and the receivers 216, 217 serve the purpose at different times of transferring traffic data and of exchanging alignment information. The process of establishing alignment between clusters in the system 200 is illustrated by a flowchart shown in FIG. 8. Upon start up (block 302), the routine 300 representing the hunting algorithm for re-routing clusters defines module 212 as "master" and module 214 as "slave", and performs an alignment setup (block 302) which determines a unique orthogonal sequence of clusters for cycling to ensure that the system steps through all possible alignment compensations. For the system 200, the orthogonal sequence is a sequence of pairs of clusters where each pair comprises one cluster from each module. The system ensures that the system steps through all the possible alignment compensations within a pre-determined range. The sequence is pre-determined and stored in local memories (not shown). The modules 212, 214 select (blocks 306, 326) the next cluster on each module from the orthogonal sequence, and a known preamble character is sent (blocks 308, 328) from the selected clusters of the transmitters 215, 219 respectively by appropriately routing the preamble character through the drive circuits 250, 251 respectively. Light from the transmitters 215, 219 is received by detector arrays 228, 227 respectively (blocks 310, 330). Thresholding circuits 261 and 260 in modules 214 and 212 respectively filter and compare (blocks 312, 332) the signals from the detector arrays 228, 227 respectively to determine (blocks 314, 334) whether the signals exceed a pre-determined threshold value, sending the results of the determination to control circuits 244 and 242 respectively as electrical signals (not shown). Control circuit 242 then sets a "Slave laser" flag to TRUE (block 336) or FALSE (block 338) depending on the result of block 334, where TRUE indicates that the preamble character has been correctly received by receiver 216. Simultaneously, depending on the result of block 314 control circuit 244 causes transmitter 219 to transmit either a predetermined "YES" character (block 316) or no signal (block 318), where a "YES" character indicates that the preamble character has been correctly received by receiver 217. If a "YES" character is then received (block 320), using receiver 216 and thresholding circuit 260, then control circuit 242 sets (block 322) a "Master laser" flag to TRUE, otherwise the control circuitry 242 sets (block 324) a "Master laser" flag to FALSE. Control circuitry 242 then determines (block 340) whether both the "Slave laser" flag and the "Master laser flag" are TRUE. If either flag is FALSE the alignment is not yet accomplished and the routine 300 loops from blocks 306 and 326. If both flags are TRUE, then the alignment is complete and the most recently selected clusters correspond to correct alignment, and the system sends traffic using those selected clusters (block 342).

The alignment setup routine 300 can be performed just once when the system is first turned on, when a new board is inserted, or it can be performed repeatedly to compensate for real-time drift or vibration.

Figure 9:
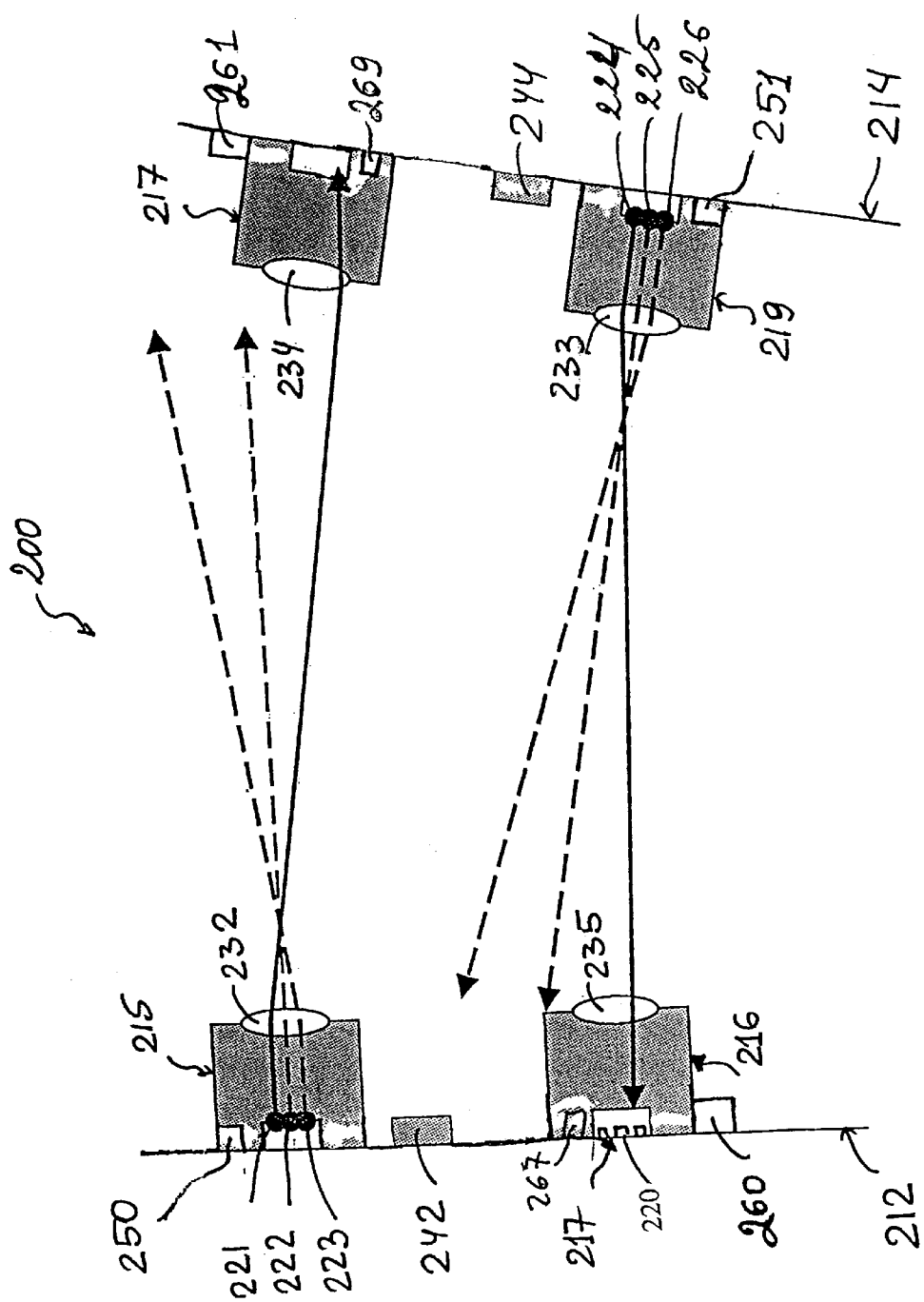
FIG. 9 illustrates misalignment compensation in the embodiment of FIG. 7.

FIG. 9 illustrates a process of the alignment of the system 200. For example, when the module 214 is tilted as shown in FIG. 9, the algorithm described above determines a correct pair of clusters, namely cluster 221 at the transmitter 215 and cluster 224 at the transmitter 219, which provide transmittance of the data to the correct physical locations at the corresponding receivers 217 and 216. The dimensions of the system 200 are similar to that of the first embodiment, namely a separation between modules 212 and 214 is about 10 inches, focal lengths of the lenses 232 and 233 are about 10 mm, an angle between the laser beams generated by the adjacent clusters is about 1 degree, thus allowing for about 4 mm alignment tolerance over 10 inches of interconnect distance.

It is also contemplated that in other embodiments, the elements of the receiver or both of the transmitter and the receiver, are arranged into clusters, the clusters forming one or two dimensional patterns of different configurations. The number of data channels transmitted in both directions from one module to the other one may be different, the hunting algorithm described above may be modified for cycling through clusters of different modules at different rates, the elements of the transmitters and/or receiver may be shared by different clusters, the system may provide a uni-directional or bi-directional link, the receiver elements may be single detectors or detector arrays. Other modifications described above in relation to other embodiments are also applicable to the third embodiment of the invention.

Figure 10:
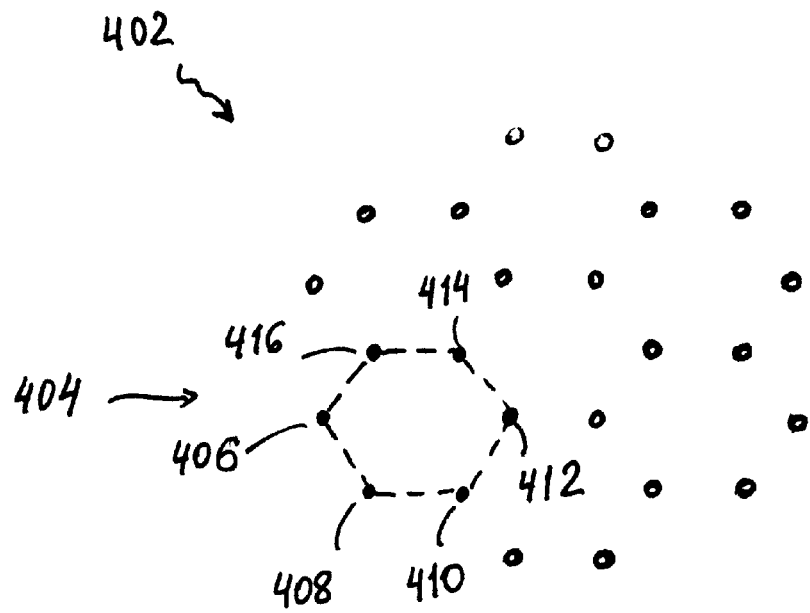
FIG. 10 illustrates a schematic view of a two-dimensional arrangement of lasers in a free space optical interconnect system according to a fourth embodiment of the invention.
Figure 11:
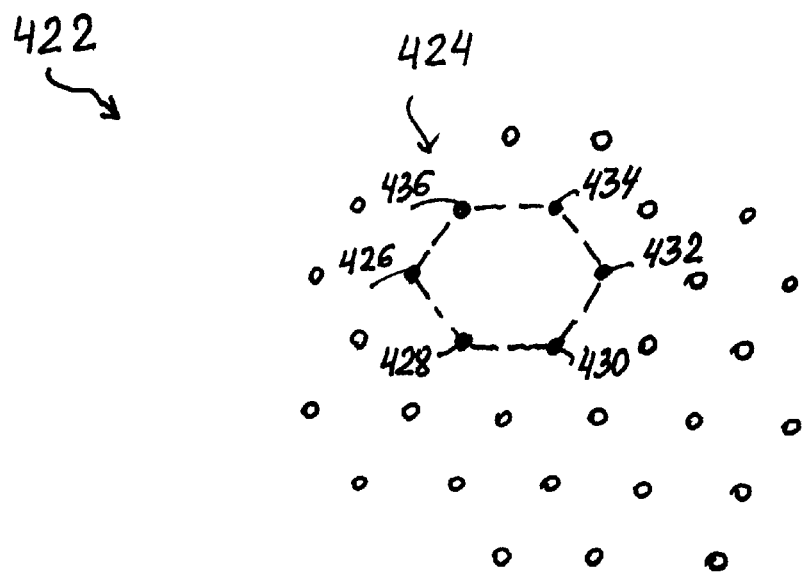
FIG. 11 illustrates a two-dimensional arrangement of detectors corresponding to the arrangement of lasers of FIG. 10.
Figure 12:
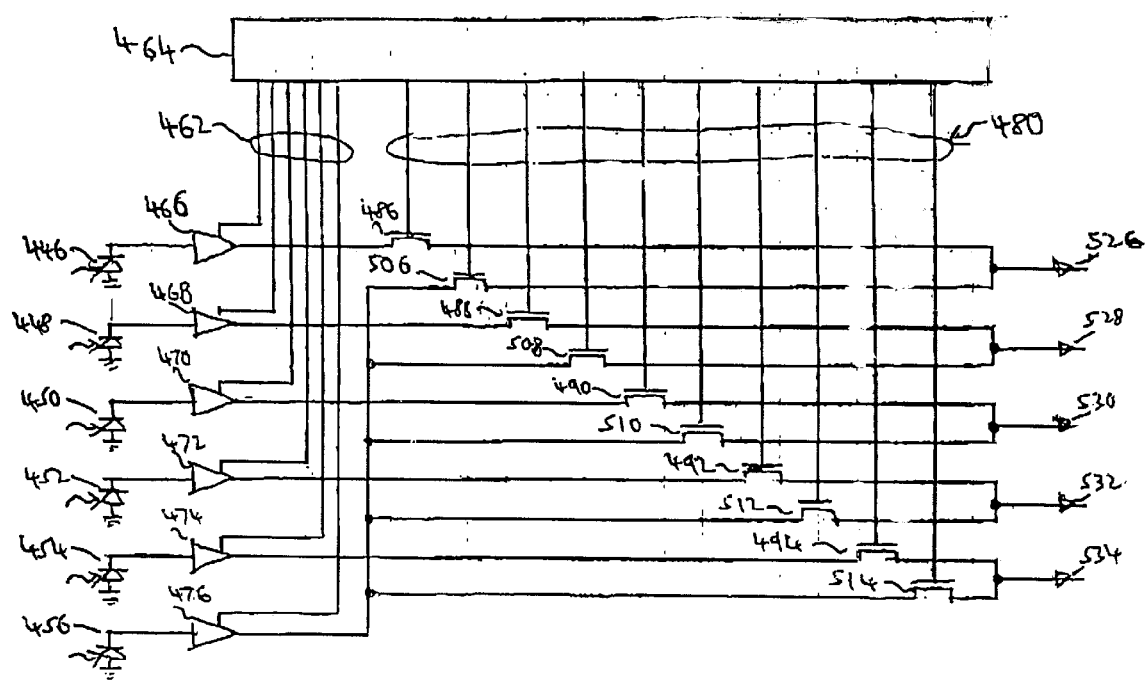
FIG. 12 illustrates a sub-circuitry for the receiver according to the fourth embodiment of the invention.

A free space optical interconnect system according to a fourth embodiment of the invention is similar to that of FIG. 5 except for the elements of both the transmitter and receiver being arranged into clusters and the number of elements in a cluster being more than the number of data channels. Aspects of this embodiment are shown in FIG. 10, FIG. 11 and FIG. 12. As a way of example, a laser array 402 of the transmitter transmits five data channels using six transmitter elements. Correspondingly, the receiver containing a detector array 422 receives five data channels using six receiver elements. Spare elements are used in the event of failure of the laser in one of the other five elements, or in the event of failure of one of the five connections due to a misalignment or a piece of dust. The laser array 402 comprises lasers that are arranged spatially at the vertices of a tessellated array of hexagons, with a laser cluster 404 consisting of the six lasers of a hexagon, with five lasers 406, 408, 410, 412, 414 of the laser cluster being used initially and the sixth laser 416 of the laser cluster being a spare. The detector array 422 comprises detectors that are arranged spatially at the vertices of a tessellated array of rhombuses with the length of the edge of each rhombus being equal to the length of the edge of the hexagon of the laser cluster 404, with a detector cluster 424 consisting of the six detectors in a hexagon, with five of the detectors 426, 428, 430, 432, 434 of the detector cluster being used initially, and the sixth detector 436 of the detector cluster being a spare. Initially, the lasers 406, 408, 410, 412, 414 and detectors 426, 428, 430, 432, 434 are used to carry the five data channels respectively. In the event of a failure of one of these lasers or detectors or another element or elements of the data path, the data of the failed channel is routed through the spare laser 416 and the spare detector 436.

Each set of clusters has an associated receiver sub-circuit shown in FIG. 12. The detectors 446, 448, 450, 452, 454, 456 of a cluster have amplifier circuits 466, 468, 470, 472, 474, 476 respectively, the amplifier circuit of the first five detectors producing signal outputs that are connected to gates 486, 488, 490, 492, 494 respectively and the amplifier circuit 476 of the sixth detector producing a signal output that is connected in parallel to gates 506, 508, 510, 512, 514. A detector signal level for each detector is also identified by the amplifier circuits and is passed to a controller 464 using a set of electrical connections 462.

The receiver sub-circuit operates in the following manner. Initially, the controller opens the gates 486, 488, 490, 492, 494 and shuts the gates 506, 508, 510, 512, 514, so as to route the data signals from the first five detectors to the five data channel outputs 526, 528, 530, 532, 534 respectively. If the detector signal level for one of the first five detectors is determined by the controller 464 to indicate that a detector is not receiving the correct signal level and that therefore the channel has failed, then the data from the spare detector 436 is routed to the corresponding data channel output by shutting the appropriate gate from the set 486, 488, 490, 492, 494 and opening the appropriate gate from the set 506, 508, 510, 512, 514, at the same time as a transmitter circuit (not shown) routes the transmitted signal of the failed channel to the spare transmitter laser 416.

It is also contemplated that the controller may examine the detector signal levels only once when a cluster is first selected, or each time a cluster is selected, or continuously during operation of the system. The number of spare channels may be zero, one, or more than one. Clusters at different locations across the laser and detector arrays may have a different number of spare channels. Other modifications described above in relation to other embodiments are also applicable to the fourth embodiment of the invention.

Free space interconnect systems formed using the techniques described above are more tolerant to misalignments between circuit packs compared to electrical connectors or other existing free space optical interconnect systems. The use of redundant clusters of elements in the transmitter and/or receiver modules obviates the need of packaging which requires precise alignment and which is often expensive and bulky. The interconnect systems based on the present invention have simpler mechanical design, have no moving parts and may be implemented with lower cost mechanics. As a result, they can be manufactured more readily and at much lower cost, providing higher reliability at the same time. For example, using the embodiments of the invention, a free space optical link offering multiple channels (>32 per sq. in.) at a rate of about 1 Gb/s each can be established in the conventional low cost mechanical environment typically encountered with telecom, data and computing products. The optical interconnect system described above is particularly advantageous for high capacity ATM and IP switches for core or larger enterprise customers and opens new possibilities for new systems architectures and network technologies for terabit routers, and for multi-processor computers.

Although specific embodiments of the invention have been described in detail, it will be apparent to one skilled in the art that variations and modifications to the embodiments may be made within the scope of the following claims.

What is claimed is:

1. A free space optical interconnect system comprising:
   a transmitter and a receiver, at least one of the transmitter and the receiver comprising a plurality of elements arranged into clusters, the number of clusters being redundant and the number of elements in each cluster being sufficient to accommodate the number of data channels to be transmitted;
   means for identifying a misalignment between the transmitter and the receiver; and means for re-routing data from the cluster which is misaligned to a redundant cluster providing data transmission through the system, the re-routing being performed in response to a signal generated by the means for identifying the misalignment wherein the means for re-routing data comprises means for cycling through the clusters of at least one of the transmitter and the receiver according to a predetermined orthogonal pattern to provide data transmission through the system.

2. A system of claim 1, wherein the means for identifying the misalignment comprises means for providing feedback between the receiver and transmitter regarding the misalignment.

3. A system of claim 1, wherein the number of elements in each cluster is equal to the number of data channels to be transmitted.

4. A system of claim 1, wherein the number of elements in a cluster is more than the number of data channels to be transmitted.

5. A system of claim 4, wherein the means for re-routing data between the clusters further comprises means for re-routing the data between the elements within a cluster.

6. A system of claim 1, wherein the elements of the transmitter only are arranged into clusters.

7. A system of claim 6, wherein the number of elements in a cluster is less than the number of data channels to be transmitted.

8. A system of claim 7, wherein the transmitter elements are capable of transmitting more than one data channel.

9. A system of claim 1, wherein different clusters include same number of elements.

10. A system of claim 1, wherein different clusters include different number of elements.

11. A system of claim 1, wherein the elements of the receiver only are arranged into clusters.

12. A system of claim 1, wherein the clusters are arranged in a one-dimensional array.

13. A system of claim 1, wherein the clusters are arranged into a two-dimensional array.

14. A system of claim 1, wherein the clusters form a pre-determined pattern which provides a required optical transmission or collection.

15. A system of claim 14, wherein the elements within clusters are arranged into a pre-determined pattern which provides a required optical transmission or collection.

16. A system of claim 1 wherein, the elements are shared between different clusters.

17. A system of claim 1, the system comprising one transmitter and one receiver only for a uni-directional interconnection.

18. A system of claim 1, the system comprising a first module and a second module, each module comprising one transmitter and one receiver for corresponding bi-directional transmittance and receiving of data.

19. A system of claim 1, wherein each cluster accommodates for misalignments within a predetermined space and angular deviation, the data being re-routed between clusters when the misalignment is beyond said deviation.

20. A system of claim 1, the system being implemented with optical elements selected from the group consisting of bulk optics, binary optics, holographic elements and integrated optics.

21. A system of claim 1 wherein the elements of the transmitter are optical emitters.

22. A system of claim 21, wherein the emitters are selected from the group consisting of VCSEL, SLD, LED and edge emitting laser diodes.

23. A system of claim 1, wherein the elements of the transmitter are optical modulators.

24. A system of claim 23, wherein the optical modulators are selected from the group consisting of modulators based on magneto-optic effect, modulators including liquid crystal devices, ferroelectric modulators, modulators including piezo-electric crystals, modulators including deformable mirrors, electro-optical semiconductor hetero-structure modulators and optical cavity modulators.

25. A system of claim 1, wherein the receiver comprises a detector selected from the group consisting of PIN detector, metal-semiconductor-metal detector and avalanche photodiode.

26. A system of claim 2, wherein the means for providing feedback between the transmitter and the receiver comprises means selected from the group consisting of optical fiber, LED, electrical cable and electrical backplane.

27. A system of claim 1, wherein the means for identifying the misalignment comprises detectors selected from the group consisting of detectors for monitoring lateral and vertical misalignments, and detectors for monitoring tilt misalignments.

28. A system of claim 1, wherein the means for identifying the misalignment comprises a dedicated alignment laser and a dedicated detector.

29. A system of claim 1, wherein the means for identifying the misalignment comprises means for monitoring a signal level at the receiver.

30. A system of claim 1, wherein the means for re-routing data comprises means for cycling through the clusters at different rates to provide data transmission through the system.

31. A system of claim 1, the system being integrated within a package.

32. A method of compensating misalignments in a free space optical interconnect system comprising a transmitter and a receiver, at least one of the transmitter and the receiver comprising a plurality of elements whose number is redundant, the elements of at least one of the transmitter and the receiver being arranged into clusters, the number of clusters being redundant and the number of elements in each cluster being sufficient to accommodate the number of the data channels to be transmitted, the method comprising the steps of:
identifying a misalignment between the transmitter and the receiver; and
re-routing data from the cluster which is misaligned to a redundant cluster providing data transmission through the system, the re-routing being performed in response to a signal generated at the step of identifying the misalignment wherein the step of re-routing data comprises cycling through the clusters according to a pre-determined orthogonal pattern to provide data transmission through the system.

33. A method of claim 32, wherein the step of identifying the misalignment further comprises sending a feedback signal between the receiver and the transmitter regarding the misalignment.

34. A method of claim 32, further comprising a step of arranging that the number of elements in each cluster is equal to the number of data channels to be transmitted.

35. A method of claim 32, further comprising a step of arranging that the number of elements in each cluster is more than the number of data channels to be transmitted.

36. A method of claim 35, wherein the step of re-routing data between the clusters further comprises re-routing data between the elements within a cluster.

37. A method of claim 32, wherein the step of identifying the misalignment comprises monitoring a signal level at the receiver.

38. A method of claim 32, wherein the step of re-routing data comprises cycling through the clusters at different rates.

39. A method of claim 32, the method providing a continuous misalignment compensation of the system within a predetermined angular and space deviation.

40. A method of compensating misalignments in a bi-directional free space optical interconnect system comprising a first module and a second module, each module having a transmitter and a receiver, at least one of the transmitter and the receiver at each module comprising a plurality of elements arranged into clusters, the number of clusters being redundant and the number of elements in each cluster being sufficient to accommodate the number of data channels to be transmitted, the method comprising the steps of:

(a) defining an orthogonal sequence of pairs of clusters, each pair comprising one cluster from each module;

(b) choosing a first pair from the sequence;

(c) re-routing data to the selected pair of clusters;

(d) monitoring corresponding signal levels of the data at the receivers;

(e) comparing signal levels at the receivers with predetermined threshold values;

(f) when the signal level at least at one of the receivers is below the threshold value, re-routing the data to the next pair of clusters from the sequence and repeating the steps (d), (e) and (f).

41. A module for a free space optical interconnect system, comprising:

at least one of a transmitter and a receiver, at least one of the transmitter and the receiver comprising a plurality of elements arranged into clusters, the number of clusters being redundant and the number of elements in each cluster being sufficient to accommodate the number of data channels to be transmitted;

means for re-routing data from the cluster which is misaligned to a redundant cluster in response to feedback identifying a misalignment of the module wherein the means for re-routing data comprises means for cycling through the clusters of at least one of the transmitter and the receiver according to a predetermined orthogonal pattern to provide data transmission through the system.

42. A module of claim 41, further comprising means for identifying a misalignment of the module in the system.

43. A module of claim 42, wherein the means for identifying the misalignment of the module comprises at least one of a dedicated alignment laser and a dedicated detector.

44. A module of claim 41, wherein the number of elements in a cluster is equal to the number of data channels to be transmitted.

45. A module of claim 41, wherein the number of elements in a cluster is more than the number of data channels to be transmitted.

46. A module of claim 45, wherein the means for re-routing data between the clusters further comprises means for re-routing data between the elements within a cluster.

47. A module of claim 41, wherein the number of elements in each cluster is the same.

48. A module of claim 41, wherein the different clusters include different number of elements.

49. A module of claim 41, wherein the clusters are arranged in a one-dimensional array.

50. A module of claim 41, wherein the clusters are arranged in a two-dimensional array.

51. A module of claim 41, wherein the clusters form a pre-determined pattern which provides a required optical transmission or collection.

52. A module of claim 51, wherein the elements of clusters are arranged into a pre-determined pattern which provides a required optical transmission or collection.

53. A module of claim 41, wherein the elements are shared between the clusters.

54. A module of claim 41, wherein the module comprises one transmitter only.

55. A module of claim 54, wherein the number of elements in each cluster is less than the number of data channels to be transmitted.

56. A module of claim 41, wherein the module comprises one receiver only.

57. A module of claim 41, wherein the module comprises one transmitter and one receiver only for corresponding transmitting and receiving of data in a bi-directional optical interconnect system.

58. A module of claim 41, wherein the elements of the transmitter are optical emitters.

59. A module of claim 41, wherein the elements of the transmitter are optical modulators.

60. A module of claim 59, wherein the means for identifying the misalignment comprises means for monitoring a signal level at the receiver.

61. A module of claim 41, further comprising means for identifying the misalignment of the module.

62. A module of claim 44, the module being implemented with optical elements selected from the group consisting of bulk optics, binary optics, holographic elements and integrated optics.

63. A module of claim 44, the module being integrated within a package.

* * * * *